US011334333B1

(12) United States Patent
Malvankar et al.

(10) Patent No.: US 11,334,333 B1
(45) Date of Patent: May 17, 2022

(54) GENERATION OF ADAPTIVE CONFIGURATION FILES TO SATISFY COMPLIANCE

(71) Applicant: INTERNATIONAL BUSINESS MACHINES CORPORATION, Armonk, NY (US)

(72) Inventors: Abhishek Malvankar, White Plains, NY (US); Shikhar Kwatra, San Jose, CA (US); Charles E. Beller, Baltimore, MD (US); Carlos A. Fonseca, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/949,667

(22) Filed: Nov. 10, 2020

(51) Int. Cl.
*G06F 8/61* (2018.01)
*G06F 8/71* (2018.01)
(Continued)

(52) U.S. Cl.
CPC .................. *G06F 8/61* (2013.01); *G06F 8/71* (2013.01); *G06F 9/44505* (2013.01);
(Continued)

(58) Field of Classification Search
CPC . G06F 40/205; G06F 8/61; G06F 8/71; G06F 9/44505; G06K 9/6256; H04L 67/02
(Continued)

(56) References Cited

U.S. PATENT DOCUMENTS 9,678,727 B1 6/2017 Chaffin
10,474,455 B2 11/2019 Makkar
(Continued)

FOREIGN PATENT DOCUMENTS

CN 110334326 B 11/2019
CN 110633079 A 12/2019
(Continued)

OTHER PUBLICATIONS

Disclosed Anonymously, "A Method for Efficiently Utilizing Config Template and Existing Config in VPC E2E Testing," IP.com, IPCOM000258935D, Jun. 27, 2019, 5 pages, IPCOM000258935D.
(Continued)

*Primary Examiner* — Marina Lee
(74) *Attorney, Agent, or Firm* — Dmitry Paskalov (57) ABSTRACT

The present invention may include an embodiment that receives a deployment declaration in a natural language. The embodiment may detect one or more sequencing entities and one or more parameter entities using trained natural language processing. The embodiment may sequence a configuration file based on the one or more sequencing entities. The embodiment may determine a plurality of configuration parameters in the sequenced configuration file. The embodiment may substitute a configuration parameter from the plurality of configuration parameters of the sequenced configuration file with the one or more parameter entities. The embodiment may align the plurality of configuration parameters of the sequenced configuration file based on organization compliance data and deploys a tuned cloud service using the sequenced configuration file.

20 Claims, 5 Drawing Sheets

(51) Int. Cl.
*H04L 67/02* (2022.01)
*G06F 40/205* (2020.01)
*G06F 9/445* (2018.01)
*G06K 9/62* (2022.01)

(52) U.S. Cl.
CPC ......... *G06F 40/205* (2020.01); *G06K 9/6256* (2013.01); *H04L 67/02* (2013.01)

(58) Field of Classification Search
USPC .................................. 717/121 and, 168–178
See application file for complete search history.

(56) References Cited

U.S. PATENT DOCUMENTS

| | | | | |
|---|---|---|---|---|
| 10,614,382 | B1* | 4/2020 | Wu | G06F 9/451 |
| 2009/0119095 | A1* | 5/2009 | Beggelman | G06F 40/30 |
| | | | | 704/9 |
| 2017/0289731 | A1* | 10/2017 | Kamineni | H04W 4/60 |
| 2018/0205616 | A1* | 7/2018 | Liu | H04L 41/5045 |
| 2019/0079853 | A1 | 3/2019 | Makkar | |
| 2019/0324768 | A1 | 10/2019 | Antonio | |
| 2020/0034723 | A1 | 1/2020 | Nakanoya | |
| 2020/0117584 | A1 | 4/2020 | Maseedu | |

FOREIGN PATENT DOCUMENTS

| | | | |
|---|---|---|---|
| EP | 1503295 | A1 | 2/2005 |
| EP | 2823601 | B1 | 6/2016 |
| WO | 2013134060 | A1 | 9/2013 |

OTHER PUBLICATIONS

Disclosed Anonymously, "The Kubernetes platform for big ideas," Red Hat OpenShift, [accessed on Jul. 10, 2020], 6 pages, Retrieved from the Internet: <URL: https://www.openshift.com/>.

Hardcastle, "IBM X-Force to Business: Configure It Out," SDXCentral, Feb. 11, 2020 [accessed on Jul. 10, 2020], 5 pages, Retrieved from the Internet: <URL: https://www.sdxcentral.com/articles/news/ibm-x-force-to-business-configure-it-out/2020/02/>.

Liu, et al., "Neural Code Completion," Conference paper at ICLR 2017, 2017 [accessed on Jul. 14, 2020], 14 pages, Retrieved from the Internet: <URL: https://openreview.net/pdf?id=rJbPBt9Ig>.

Mell, et al., "The NIST Definition of Cloud Computing", National Institute of Standards and Technology, Special Publication 800-145, Sep. 2011, 7 pages.

Missinato, "Deep coding: when the machine learns to code by itself," SpinDox Digital, Soul, Nov. 12, 2012 [accessed on Jul. 13, 2020], 5 pages, Retrieved from the Internet: <URL: https://www.spindox.it/en/blog/deep-coding-ai-2/>.

Redhat Openshit, "Innovation without limitation," Datasheet [online], 2020, 5 pages, Retrieved from the Internet: <URL: https://www.openshift.com/>.

Redhat Openshift, "Innovation without limitation," Datasheet [online], 2020, 5 pages, Retrieved from the Internet: <URL: https://www.openshift.com/>.

* cited by examiner

GENERATION OF ADAPTIVE CONFIGURATION FILES TO SATISFY COMPLIANCE

BACKGROUND

The present invention relates, generally, to the field of computing, and more particularly to automatic generation of adaptive configuration files to satisfy compliance in a cloud infrastructure.

Cloud infrastructure or cloud computing is an on-demand availability of computer system resources, such as data storage and computing power, that does not require active management by the user. Typically, cloud infrastructure comprises data centers that are available to many users over the internet. Cloud computing relies on sharing of resources to achieve coherence and economies of scale. Cloud infrastructure may have various deployment models such as private cloud, public cloud and hybrid cloud.

Hybrid cloud is typically a cloud computing environment that uses a combination of on-premises, private cloud and third-party, public cloud services by synthesizing between the two platforms. The synthesizing is defined as allowing workloads to move between private and public clouds as computing needs and costs change. The hybrid cloud solutions give businesses greater flexibility and more data deployment options.

Deploying software components in the cloud require service specific configuration files, such as YAML, a human-readable data serialization language. YAML is commonly used for configuration files and in applications where data is being stored or transmitted. YAML targets many of the same communications applications as Extensible Markup Language (XML) but has a minimal syntax which intentionally differs from Standard Generalized Markup Language (SGML). YAML files may be analyzed using different techniques such as by natural language processing (NLP).

NLP is a field of computer science, artificial intelligence, and computational linguistics related to the interactions between computers and human natural languages such as programming computers to process large natural language corpora.

SUMMARY

According to one embodiment, a method, computer system, and computer program product for automatic generation of adaptive configuration files to satisfy compliance in a cloud infrastructure is provided. The present invention may include an embodiment that receives a deployment declaration in a natural language. The embodiment may detect one or more sequencing entities and one or more parameter entities using trained natural language processing. The embodiment may sequence a configuration file based on the one or more sequencing entities. The embodiment may determine a plurality of configuration parameters in the sequenced configuration file. The embodiment may substitute a configuration parameter from the plurality of configuration parameters of the sequenced configuration file with the one or more parameter entities. The embodiment may align the plurality of configuration parameters of the sequenced configuration file based on organization compliance data and deploys a cloud service using the sequenced configuration file.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to generation of adaptive configuration files to satisfy compliance in a cloud infrastructure. The following described exemplary embodiments provide a system, method, and program product to, among other things, to receive a deployment declaration in a natural language and generate a configuration file that is based on analyzing the query and the existing compliance parameters of the infrastructure. Therefore, the present embodiment has the capacity to improve the technical field of configuration file generation that satisfies compliance by converting the deployment declaration from a natural language into the configuration file for deployment by using a trained machine learning component.

As previously described, deploying software components in the cloud require service specific configuration files, such as YAML, a human-readable data serialization language. YAML is commonly used for configuration files and in applications where data is being stored or transmitted. YAML targets many of the same communications applications as Extensible Markup Language (XML) but has a minimal syntax which intentionally differs from Standard Generalized Markup Language (SGML). YAML files may be analyzed using different techniques such as by natural language processing (NLP).

In order to deploy a software system in the cloud, a user is required to set different knobs in one or more configuration files such as YAML configuration files. Typically, the user modifies one of the YAML files available on the opensource repositories by updating the values in the already existing configuration files, such as by updating storage mount points, storage type input directory, output directory, memory requirement, key location in case of an SSL deployment, and adds commands and keys from his experience. Typically, the build of the target environment is unknown to the user and, thus, the user executes the newly configured YAML file in order to validate that it may lead to generation of processes or containers that expose more information than required, or leaks sensitive information especially in hybrid cloud infrastructures.

As such, it may be advantageous to, among other things, implement a system that parses a query in a natural language that contains a deployment declaration to identify entities, and generates a configuration file based on the identified entities and their corresponding sequence using a machine learning-based trained sequencing model. In addition, the system may further perform an alignment of parameter values of the generated configuration file that is based on the compliance needs of the organization and deploy the service in the cloud using the generated configuration file.

According to one embodiment, a sequence model is trained based on the existing configuration files available online and generates a configuration file in a YAML format from a natural language query. According to the embodiment, the sequence model may be a deep neural network that is trained using existing data that comprises multiple configuration files. This sequence model is configured to detect, from the existing configuration files, an associated to each sequencing entity block of code. For example, the sequencing entity name may be determined by analyzing an annotation of each block of code that is typically left by the developer. The generated configuration file is then updated based on the organization compliance data of the organization and deployed in the cloud.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to generate a configuration file from a query in a natural language using NLP and trained sequencing model.

Figure 1:
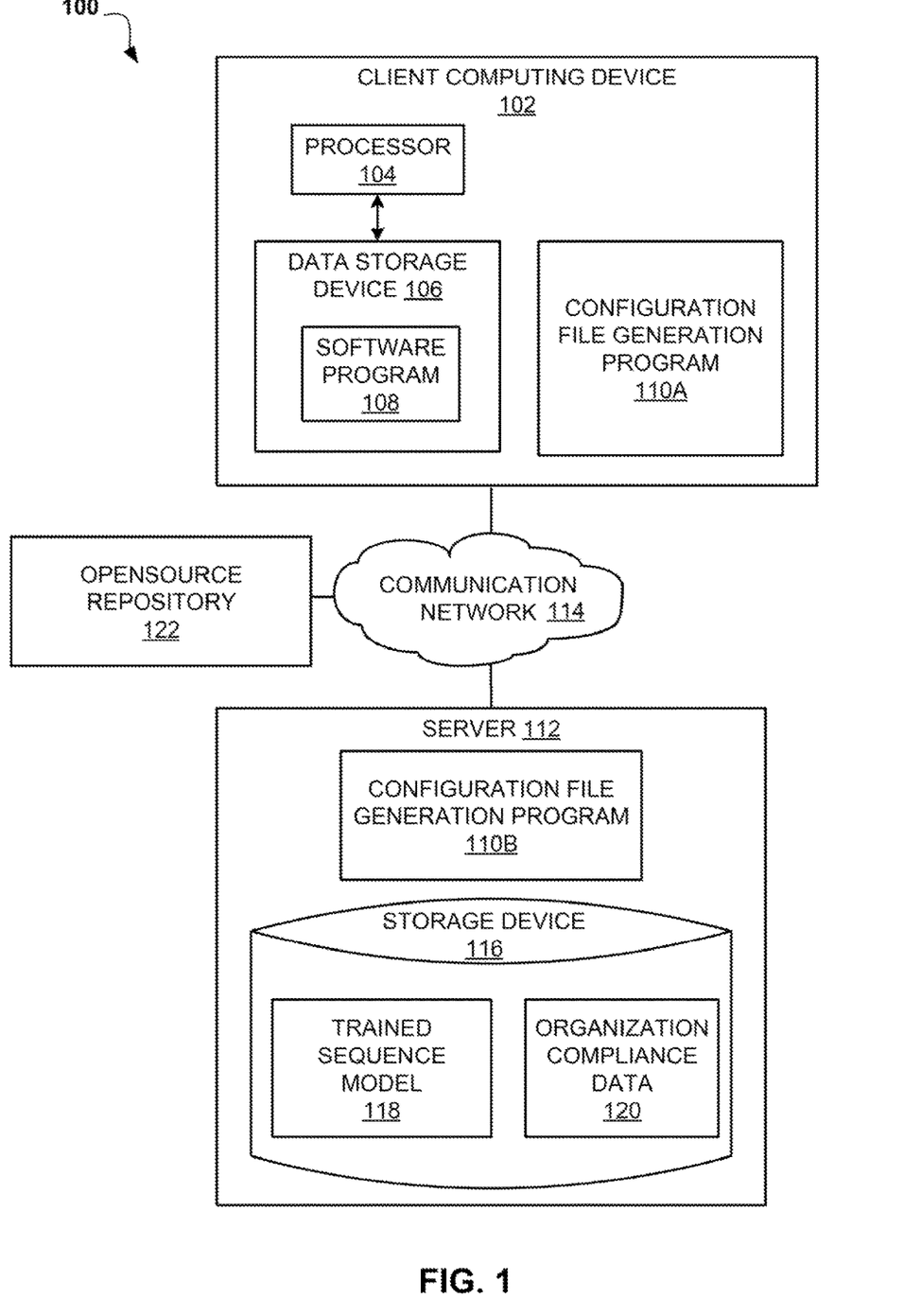
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102, a server 112 and an opensource repository 122 interconnected via a communication network 114. According to at least one implementation, the networked computer environment 100 may include a plurality of client computing devices 102, servers 112 and opensource repositories 122, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a configuration file generation (CFG) program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

Opensource repository 122 may be one or more servers such as server 112 that enables hosting and access to one or more configuration files, such as YAML configuration files, that are used for configuring a software application or service to operate in the cloud. For example, Opendatahub may be used as an opensource repository 122.

The server computer 112 may be a laptop computer, netbook computer, personal computer (PC), a desktop computer, or any programmable electronic device or any network of programmable electronic devices capable of hosting and running a configuration file generation (CFG) program 110B and a storage device 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The storage device 116 may store a trained sequence model 118 and an organization compliance data 120. The trained sequence model 118 may be a trained neural network or other trained machine learning model that generates a configuration file from one or more entities by accessing the corresponding to the entity code block from the opensource repository 122. For example, the trained sequence model 118 may generate a table having a list of available entities and a corresponding vector that points to the code in the opensource repository 122. The organization compliance data 120 may be one or more configuration files or other structured or unstructured compliance data used by the organization of the user to enforce compliance of the services. For example, environment compliance data 120 may store YAML files of the organization that includes parameters and compliance requirements of the organization such as SSL and other security requirements.

According to the present embodiment, the CFG program 110A, 110B may be a program capable of receiving a deployment declaration in a natural language, extracting entities from the declaration and generating a configuration file based on the extracted declaration using a trained sequence model 118. The configuration file generation method is explained in further detail below with respect to FIG. 2.

Figure 2:
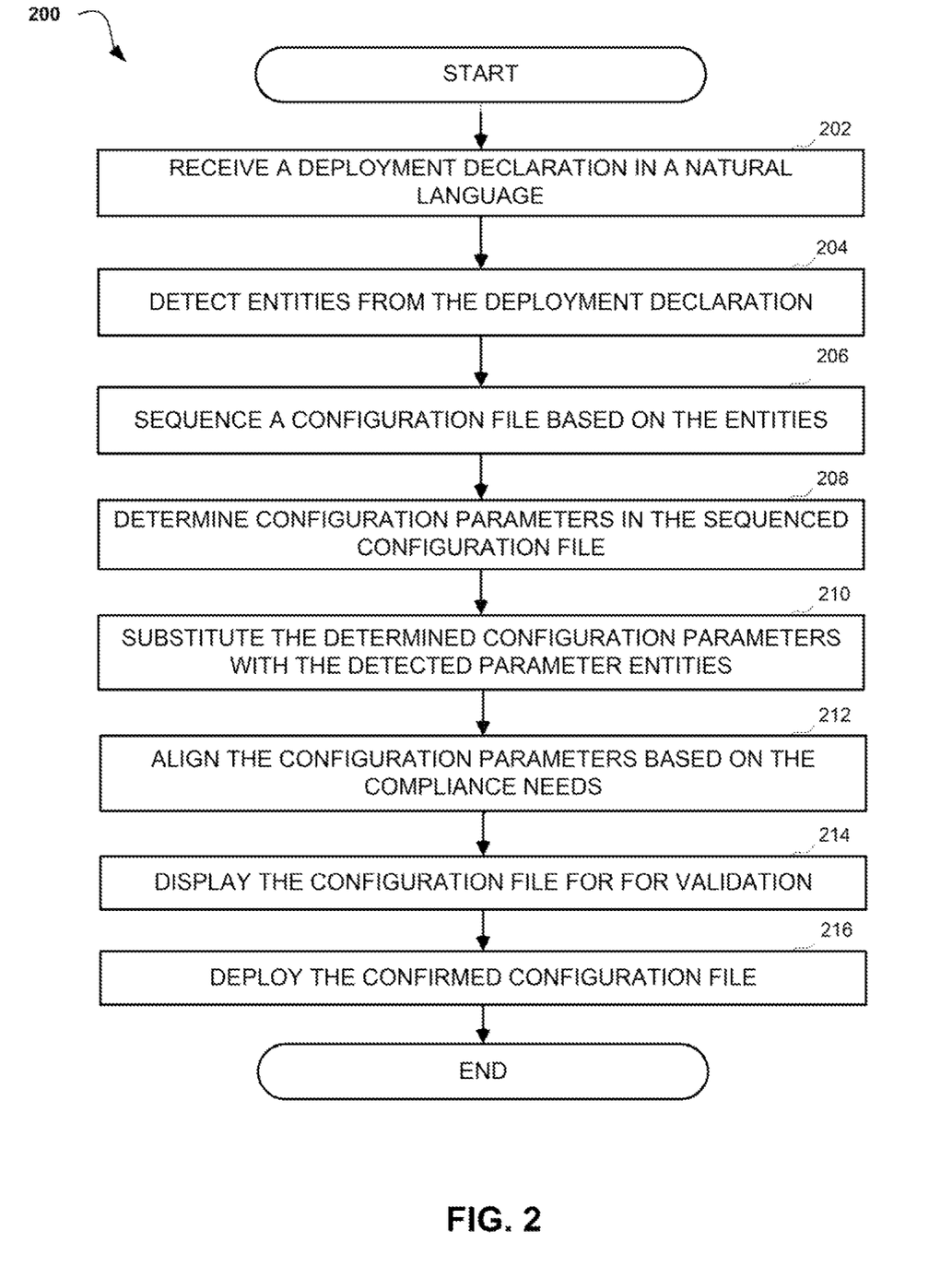
FIG. 2 is an operational flowchart illustrating a configuration file generation process according to at least one embodiment.

Referring now to FIG. 2, an operational flowchart illustrating a configuration file generation process 200 is depicted according to at least one embodiment. At 202, the configuration file generation (CFG) program 110A, 110B receives a deployment declaration in a natural language. The deployment declaration may be a short sentence in a natural language that defines the user-required cloud service, such as a name of the service, a computing framework, a deployment environment, and a type of distributed database. According to an example embodiment, CFG program 110A, 110B may receive the deployment declaration as a query in a natural language by accessing an input device that is configured to receive an input in a natural language such as a microphone or a keyboard. In another embodiment, CFG program 110A, 110B may receive a media file that contains an input in a natural language such as a voice or a text file. For example, a deployment declaration may be "deploy a 3-node spark cluster in pre-prod env with 2 node Cassandra database."

Next, at 204, the CFG program 110A, 110B detects entities from the deployment declaration. According to an example embodiment, the CFG program 110A, 110B may convert the received query in a natural language into text by using a general NLP algorithm. Then, the CFG program 110A, 110B may analyze the text to extract two types of entities such as sequence entities and parameter entities. The sequence entities are keywords that correspond to a specific block of code in the configuration file while parameter entities are values, variables and numbers used to configure variables and define the number of components. According to an example embodiment, the CFG program 110A, 110B may use a trained machine learning model such as trained sequence model 118 to analyze the text and extract the entities from the text based on previously ingested examples of configuration files from the opensource repository 122. According to an example embodiment, the CFG program 110A, 110B may detect numbers as parameter entities and associated phrases as sequence entities. To continue the previous example, the CFG program 110A, 110B may detect the "node spark cluster", "pre prod", and "node Cassandra" as sequence entities and "3" and "2" as parameter entities from the deployment declaration.

Then, at 206, the CFG program 110A, 110B sequences a configuration file based on the entities. According to an example embodiment, the CFG program 110A, 110B may generate the configuration file, such as a YAML file, by substituting each detected sequence entity with an associated block of code using trained sequence model 118. For example, the CFG program 110A, 110B may use trained sequence model 118 and the environment compliance data 120 to copy corresponding to the sequence entities blocks of the code located in the opensource repository 118 and the environment compliance data 120.

Next, at 208, the CFG program 110A, 110B determines configuration parameters in the sequenced configuration file. According to an example embodiment, the CFG program 110A, 110B may search and flag all the parameters that are typically updated in the sequenced file such as values, indexes, and paths in order to adjust them according to the requirements of the organization. For example, during the training period, the CFG program 110A, 110B may maintain a list of all the parameter entities determined while analyzing opensource repository 122. Then, when any of the entities of the sequenced configuration file match one of the parameter entities in the list, the CFG program 110A, 110B may flag them as one of the configuration parameters.

Then, at 210, the CFG program 110A, 110B substitutes the determined configuration parameters with the detected parameter entities. According to an example embodiment, the CFG program 110A, 110B may substitute each determined configuration parameter in the sequenced configuration file with the available corresponding parameter entity from the deployment declaration. To continue previous example, the sequence entity "node cassandra" may be substituted with the following code block:

cluster name: 'Test Cluster'
    num_tokens: 256
    hinted_handoff_enabled: true
    max_hint_window_in_ms: 10800000
    hinted_handoff_throttle_in_kb: 1024
    max_hints_delivery_threads: 2
    hints_directory: /cassandra_data/hints
    hints_flush_period_in_ms: 10000
    max_hints_file_size_in_mb: 128
    batchlog_replay_throttle_in_kb: 1024
    dynamic_snitch_badness_threshold: 0.1
    request_scheduler: org.apache.cassandra.scheduler.NoScheduler
    server_encryption_options:
    internode_encryption: none
    keystore: conf/.keystore
    keystore_password: cassandra
    truststore: conf/.truststore
    truststore_password: cassandra
    client_encryption_options:
    enabled: false
    inter_dc_tcp_nodelay: false
    tracetype_query_ttl: 86400
    tracetype_repair_ttl: 604800
    gc_warn_threshold_in_ms: 1000
    enable_user_defined_functions: false
    enable_scripted_user_defined_functions: false
    windows_timer_interval: 1
    transparent_data_encryption_options:
    enabled: false
    chunk_length_kb: 64
    cipher: AES/CBC/PKCS5Padding
    key_alias: testing:1
    key_provider:
    class_name: org.apache.cassandra.security.JKSKeyProvider
    parameters:
    keystore: conf/.keystore
    keystore_password: cassandra
    store_type: JCEKS
    key_password: cassandra Then, at 212, the CFG program 110A, 110B aligns the configuration parameters based on the compliance needs. According to an example embodiment, the CFG program 110A, 110B may locate similar configuration parameter values from the available configuration files located in the environment compliance data 120. For example, configuration parameters may be a path, an IP number, memory allocation, SSL server location, login etc. In another embodiment, the CFG program 110A, 110B may ask a user to verify the determined parameter in case the deployment declaration parameter value deviates from the values for the same sequencing entity in the environment compliance data 120. In further embodiment, the CFG program 110A, 110B may prioritize the value of the deployment declaration over environment compliance data 120 or vise versa. Alternatively, the CFG program 110A, 110B may perform performance tuning of the configuration file by optimizing parameter entities and other parameters in the configuration file so that the application or the service will run optimally. Performance tuning of the configuration file may improve execution speed, memory, CPU or any other operation of the hardware. The performance tuning may be based on the user request in the deployment declaration. For example, a deployment declaration of "provide distributed Cassandra DB with max storage and minimum latency", is analyzed by the CFG program 110A, 110B that may update the "storage" and "latency" parameters with the maximum storage and minimum latency values found in an opensource repository.

Next, at 214, the CFG program 110A, 110B displays the configuration file for validation. According to an example embodiment, the CFG program 110A, 110B may run a YAML editor on the client computing device 102 and allow the user to edit the sequenced configuration file and, after the editing, request user confirmation.

Then, at 216, the CFG program 110A, 110B deploys the configuration file. According to an example embodiment, the CFG program 110A, 110B may execute the confirmed configuration file to deploy the service in the cloud. For example, a user may execute the configuration file using Docker® Compose (Docker® and all Docker®-based trademarks and logos are trademarks of Docker, Inc. or registered trademarks of Docker, Inc. and/or its affiliates).

It may be appreciated that FIG. 2 provides only an illustration of one implementation and does not imply any limitations with regard to how different embodiments may be implemented. Many modifications to the depicted environments may be made based on design and implementation requirements.

Figure 3:
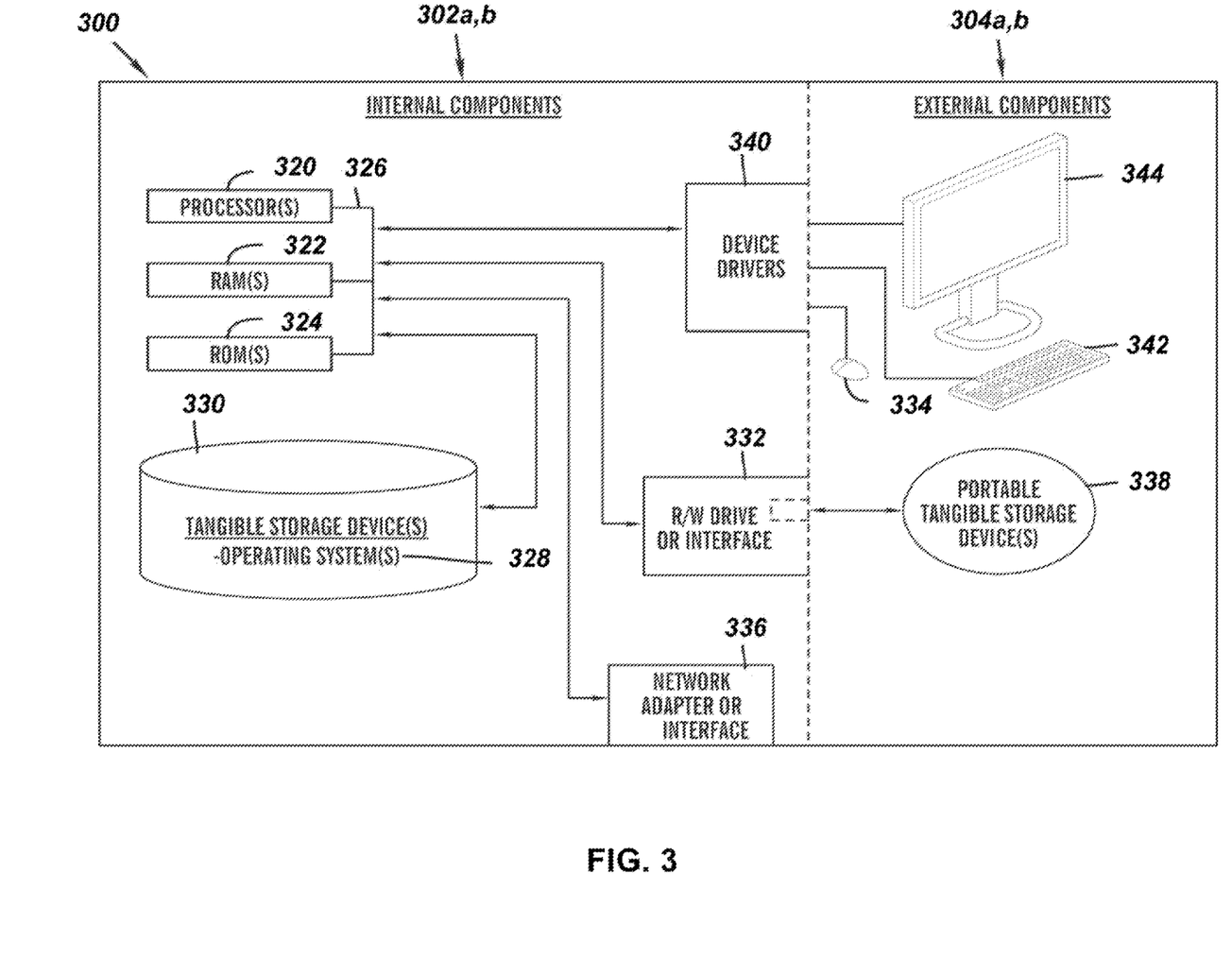
FIG. 3 is a block diagram of internal and external components of computers and servers depicted in FIG. 1 according to at least one embodiment.

FIG. 3 is a block diagram 300 of internal and external components of the client computing device 102, the server 112 and depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may be represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the CFG program 110A in the client computing device 102, and the CFG program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302a,b also includes a RAY drive or interface 332 to read from and write to one or more portable computer-readable tangible storage devices 338 such as a CD-ROM, DVD, memory stick, magnetic tape, magnetic disk, optical disk or semiconductor storage device. A software program, such as the cognitive screen protection program 110A, 110B, can be stored on one or more of the respective portable computer-readable tangible storage devices 338, read via the respective R/W drive or interface 332, and loaded into the respective hard drive 330.

Each set of internal components 302a,b also includes network adapters or interfaces 336 such as a TCP/IP adapter cards, wireless Wi-Fi interface cards, or 3G or 4G wireless interface cards or other wired or wireless communication links. The software program 108 and the CFG program 110A in the client computing device 102 and the CFG program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the CFG program 110A in the client computing device 102 and the CFG program 110B in the server 112 are loaded into the respective hard drive 330. The network may comprise copper wires, optical fibers, wireless transmission, routers, firewalls, switches, gateway computers and/or edge servers.

Each of the sets of external components 304a,b can include a computer display monitor 344, a keyboard 342, and a computer mouse 334. External components 304a,b can also include touch screens, virtual keyboards, touch pads, pointing devices, and other human interface devices. Each of the sets of internal components 302a,b also includes device drivers 340 to interface to computer display monitor 344, keyboard 342, and computer mouse 334. The device drivers 340, RAY drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
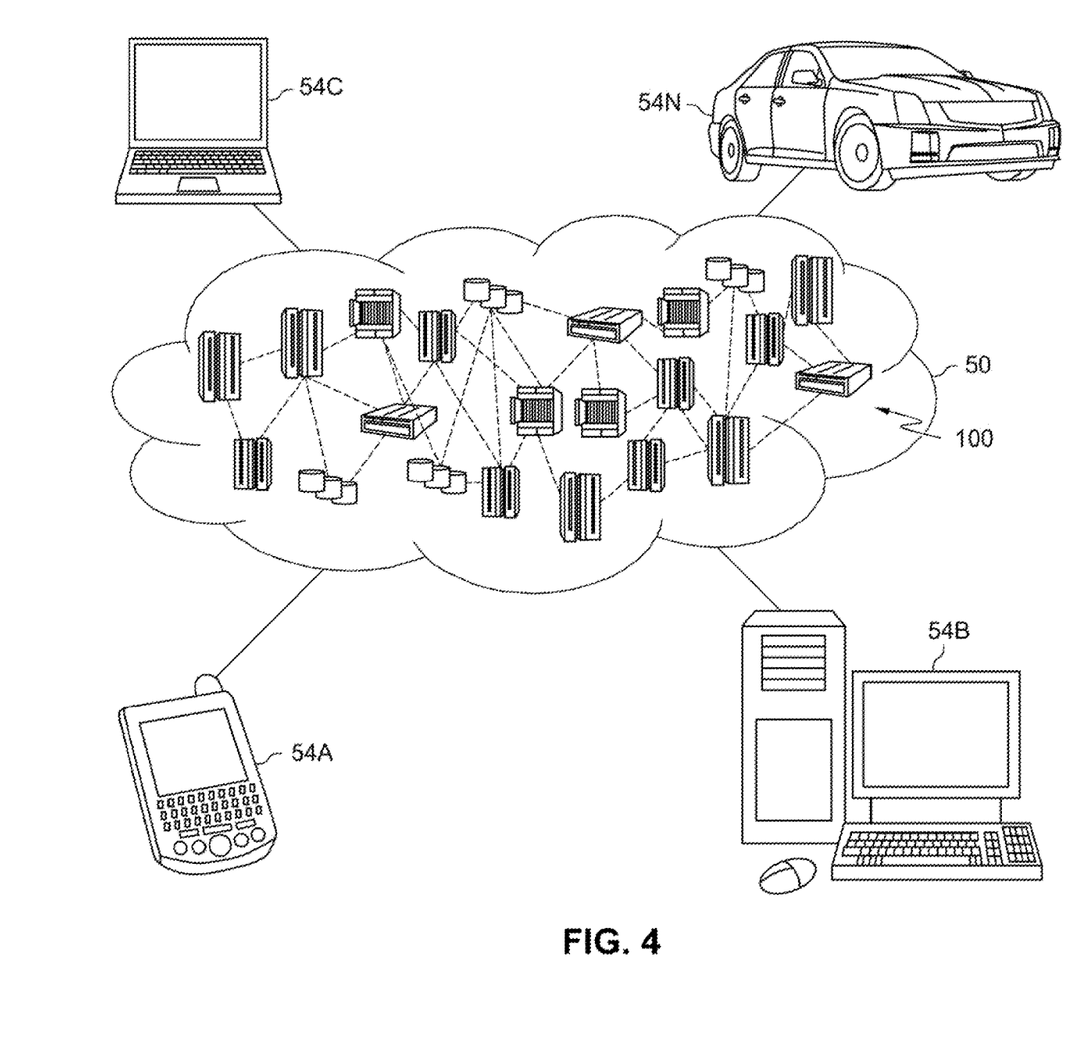
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
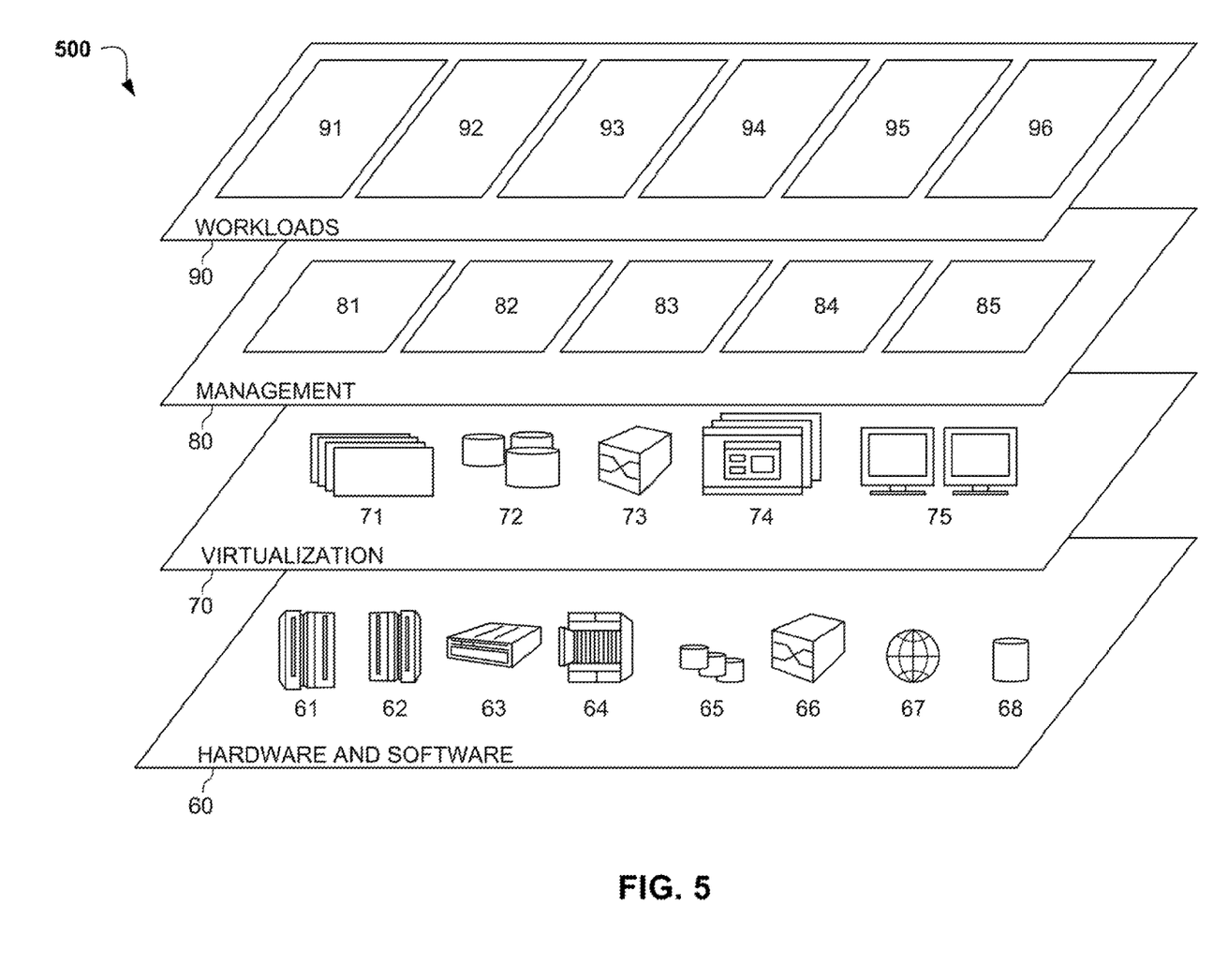
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and configuration file generation 96. Configuration file generation 96 may relate to automatically sequencing a configuration file based on a deployment declaration in a natural language using trained sequencing model.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for configuration file generation, the method comprising:
   receiving a deployment declaration for an environment in a natural language;
   detecting one or more sequencing entities and one or more parameter entities from the deployment declaration using trained natural language processing;
   sequencing a configuration file based on the one or more sequencing entities;
   determining a plurality of configuration parameters in the sequenced configuration file;
   substituting a configuration parameter from the plurality of configuration parameters of the sequenced configuration file with the one or more parameter entities;
   aligning the plurality of configuration parameters of the sequenced configuration file based on organization compliance data by locating configuration parameter values from configuration files located in the environment; and
   deploying a cloud service using the sequenced configuration file.

2. The processor-implemented method of claim 1, wherein aligning the plurality of configuration parameters of the sequenced configuration file based on the organization compliance data further comprises tuning of the sequenced configuration file based on the deployment declaration.

3. The processor-implemented method of claim 1, wherein sequencing the configuration file based on the one or more sequencing entities comprises:
   training a sequence model using an opensource repository, wherein the opensource repository comprises one or more configuration files;
   determining, using the sequence model, one or more code blocks in the opensource repository associated with each of the detected one or more sequencing entities; and
   generating the configuration file from the one or more code blocks.

4. The processor-implemented method of claim 3, wherein determining the plurality of configuration parameters in the sequenced configuration file comprises:
   determining one or more parameter entities of the sequenced configuration file; and
   flagging the one or more parameter entities of the configuration file as the plurality of the configuration parameters based on determining that the one or more parameter entities of the sequenced configuration file are on a list, wherein the list was generated during training of the sequence model.

5. The processor-implemented method of claim 1, wherein the organization compliance data comprises one or more configuration files of an organization.

6. The processor-implemented method of claim 5, wherein the one or more parameter entities comprise values, variables and numbers associated with the organization.

7. The processor-implemented method of claim 1, wherein aligning the plurality of configuration parameters of the sequenced configuration file based on the organization compliance data further comprises prioritizing a value of the configuration parameter from the deployment declaration over the value of the configuration parameter from the organization compliance data.

8. A computer system for configuration file generation, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
      receiving a deployment declaration for an environment in a natural language;
      detecting one or more sequencing entities and one or more parameter entities from the deployment declaration using trained natural language processing;
      sequencing a configuration file based on the one or more sequencing entities;
      determining a plurality of configuration parameters in the sequenced configuration file;
      substituting a configuration parameter from the plurality of configuration parameters of the sequenced configuration file with the one or more parameter entities;
      aligning the plurality of configuration parameters of the sequenced configuration file based on organization compliance data by locating configuration parameter values from configuration files located in the environment; and
      deploying a cloud service using the sequenced configuration file.

9. The computer system of claim 8, wherein aligning the plurality of configuration parameters of the sequenced configuration file based on the organization compliance data further comprises tuning of the sequenced configuration file based on the deployment declaration.

10. The computer system of claim 8, wherein sequencing the configuration file based on the one or more sequencing entities comprises:
   training a sequence model using an opensource repository, wherein the opensource repository comprises one or more configuration files;
   determining, using the sequence model, one or more code blocks in the opensource repository associated with each of the detected one or more sequencing entities; and
   generating the configuration file from the one or more code blocks.

11. The computer system of claim 10, wherein determining the plurality of configuration parameters in the sequenced configuration file comprises:
   determining one or more parameter entities of the sequenced configuration file; and
   flagging the one or more parameter entities of the configuration file as the plurality of the configuration parameters based on determining that the one or more parameter entities of the sequenced configuration file are on a list, wherein the list was generated during training of the sequence model.

12. The computer system of claim 8, wherein the organization compliance data comprises one or more configuration files of an organization.

13. The computer system of claim 12, wherein the one or more parameter entities comprise values, variables and numbers associated with the organization.

14. The computer system of claim 8, wherein aligning the plurality of configuration parameters of the sequenced configuration file based on the organization compliance data further comprises prioritizing a value of the configuration parameter from the deployment declaration over the value of the configuration parameter from the organization compliance data.

15. A computer program product for configuration file generation, the computer program product comprising:
one or more computer-readable tangible storage medium and program instructions stored on at least one of the one or more tangible storage medium, the program instructions executable by a processor, the program instructions comprising:
program instructions to receive a deployment declaration for an environment in a natural language;
program instructions to detect one or more sequencing entities from the deployment declaration and one or more parameter entities using trained natural language processing;
program instructions to sequence a configuration file based on the one or more sequencing entities;
program instructions to determine a plurality of configuration parameters in the sequenced configuration file;
program instructions to substitute a configuration parameter from the plurality of configuration parameters of the sequenced configuration file with the one or more parameter entities;
program instructions to align the plurality of configuration parameters of the sequenced configuration file based on organization compliance data by program instructions to locate configuration parameter values from configuration files located in the environment; and
program instructions to deploy a cloud service using the sequenced configuration file.

16. The computer program product of claim 15, wherein program instructions to align the plurality of configuration parameters of the sequenced configuration file based on the organization compliance data further comprises program instructions to tune the sequenced configuration file based on the deployment declaration.

17. The computer program product of claim 15, wherein program instructions to sequence the configuration file based on the one or more sequencing entities comprises:
program instructions to train a sequence model using an opensource repository, wherein the opensource repository comprises one or more configuration files;
program instructions to determine, using the sequence model, one or more code blocks in the opensource repository associated with each of the detected one or more sequencing entities; and
program instructions to generate the configuration file from the one or more code blocks.

18. The computer program product of claim 17, wherein program instructions to determine the plurality of configuration parameters in the sequenced configuration file comprises:
program instructions to determine one or more parameter entities of the sequenced configuration file; and
program instructions to flag the one or more parameter entities of the configuration file as the plurality of the configuration parameters based on determining that the one or more parameter entities of the sequenced configuration file are on a list, wherein the list was generated during training of the sequence model.

19. The computer program product of claim 15, wherein the organization compliance data comprises one or more configuration files of an organization.

20. The computer program product of claim 19, wherein the one or more parameter entities comprise values, variables and numbers associated with the organization.

* * * * *